US012062230B2

(12) United States Patent
Tanaka et al.

(10) Patent No.: US 12,062,230 B2
(45) Date of Patent: Aug. 13, 2024

(54) INFORMATION PROCESSING SYSTEM, INFORMATION PROCESSING DEVICE, AND INFORMATION PROCESSING METHOD FOR IDENTIFICATION OF A FLOOD-DAMAGED AREA

(71) Applicant: RAKUTEN GROUP, INC., Tokyo (JP)

(72) Inventors: Daiki Tanaka, Tokyo (JP); Toshiaki Tazume, Tokyo (JP); Takayoshi Inuma, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 439 days.

(21) Appl. No.: 17/392,370

(22) Filed: Aug. 3, 2021

(65) Prior Publication Data
US 2022/0100986 A1    Mar. 31, 2022

(30) Foreign Application Priority Data

Sep. 30, 2020   (JP) ................................. 2020-164443

(51) Int. Cl.
*G06V 20/17*    (2022.01)
*G06N 20/00*    (2019.01)

(52) U.S. Cl.
CPC ............. *G06V 20/17* (2022.01); *G06N 20/00* (2019.01)

(58) Field of Classification Search
CPC ....... G06V 20/17; G06V 20/176; G06N 20/00
See application file for complete search history.

(56) References Cited

U.S. PATENT DOCUMENTS

| 11,410,416 B1* | 8/2022 | Khmelev ................ G05B 15/02 |
| 11,521,379 B1* | 12/2022 | Wang .................. G06V 10/7715 |
| 2006/0064242 A1 | 3/2006 | Litvack et al. |
| 2011/0313655 A1 | 12/2011 | Litvack et al. |
| 2015/0111524 A1* | 4/2015 | South .................... G08B 27/001 455/404.2 |
| 2017/0124843 A1 | 5/2017 | Abrahams et al. |
| 2018/0073879 A1* | 3/2018 | Hakeem .................. B64C 39/02 |
| 2019/0238433 A1* | 8/2019 | Speasl ................. H04L 67/1095 |
| 2019/0313230 A1 | 10/2019 | MacGabann |
| 2021/0192629 A1* | 6/2021 | Tofte ..................... B64C 39/024 |

(Continued)

FOREIGN PATENT DOCUMENTS

| JP | 2006-338081 A | 12/2006 |
| JP | 2008-513779 A | 5/2008 |

(Continued)

OTHER PUBLICATIONS

Yona Tanaka, "Insurance amount DX of Four Non-life Insurance Companies using AI to prepare for Catastrophic Disasters", Nikkei Computer Inc. No. 1026 Nikkei Computer, Japanese Nikkei BP Inc. Nikkei Business Publications, Inc., Oct. 1, 2020, pp. 92-95 (4 pages).

(Continued)

*Primary Examiner* — Edward F Urban
*Assistant Examiner* — Wassim Mahrouka
(74) *Attorney, Agent, or Firm* — Sughrue Mion, PLLC

(57) ABSTRACT

Information processing system S acquires sensing data obtained through sensing downward from the sky by an UAV 1 flying in a specific zone, and identifies flood-damaged area where flood damage has occurred in the specific zone on the basis of the acquired sensing data.

11 Claims, 9 Drawing Sheets

(56) References Cited

U.S. PATENT DOCUMENTS

| | | | |
|---|---|---|---|
| 2021/0280051 A1* | 9/2021 | Bingham | G08B 31/00 |
| 2023/0169598 A1* | 6/2023 | Pedersen | H04N 7/185 |
| | | | 705/4 |
| 2023/0222642 A1* | 7/2023 | Watanabe | G06T 7/0002 |
| | | | 382/106 |

FOREIGN PATENT DOCUMENTS

| | | |
|---|---|---|
| JP | 2018-203042 A | 12/2018 |
| JP | 2019-66519 A | 4/2019 |

OTHER PUBLICATIONS

English translation of explanation of relevance for the references in Japanese Office Action dated Nov. 24, 2021, issued in Japanese Patent Application No. 2020-164443.

* cited by examiner

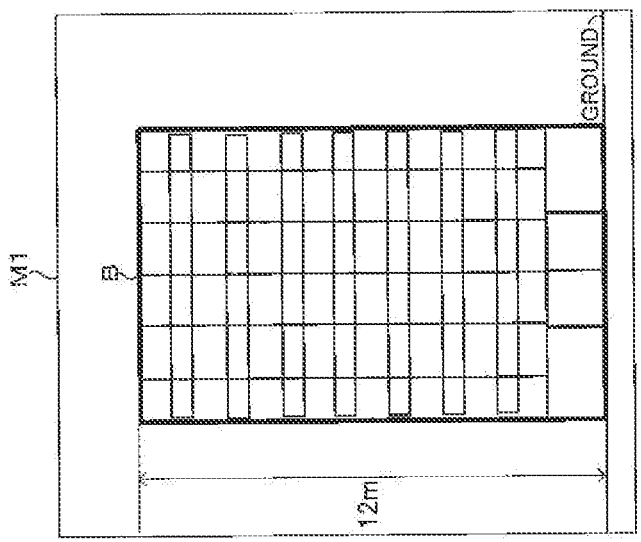

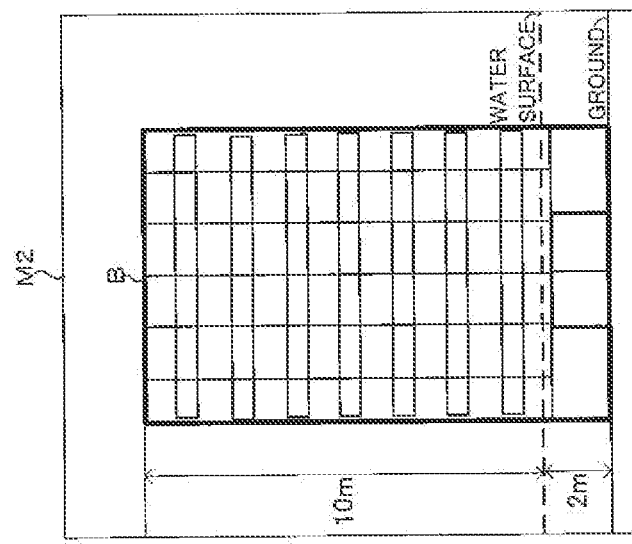

INFORMATION PROCESSING SYSTEM, INFORMATION PROCESSING DEVICE, AND INFORMATION PROCESSING METHOD FOR IDENTIFICATION OF A FLOOD-DAMAGED AREA

CROSS REFERENCE TO RELATED APPLICATION

This application claims priority from Japanese Patent Application No. 2020-164443 which was filed on Sep. 30, 2020, the disclosure of which is herein incorporated by reference in its entirety.

TECHNICAL FIELD

One or more embodiments of the present invention relates to a technical field such as a system configured to identify a flood-damaged area where flood damage has occurred.

RELATED ART

At occurrence of a natural disaster, roads are assumed to be blocked by a mudslide, rubble, or the like, and rescue operation is difficult to perform along a normal route. Therefore, for further efficient access to a person in need of rescue, the road information of the disaster site and the distribution condition of collapsed buildings are confirmed in advance using an unmanned moving machine. JP 2006-338081 A discloses a technique in which a plurality of robots are dropped to a disaster site, and from the point where the robots land, surrounding environment including the road surface condition is filmed.

However, particularly when a road or the like is submerged due to flood damage over a wide range, it has been difficult to quickly identify the flood-damaged area with such a technique in which a robot is dropped and surrounding environment is filmed as in JP 2006-338081 A.

Therefore, one or more embodiments of the present invention are directed to providing an information processing system, an information processing device, and an information processing method with which a flood-damaged area can be quickly identified.

SUMMARY

In response to the above issue, the information processing system includes: at least one memory configured to store program code; and at least one processor configured to access the program code and operate as instructed by the program code. The program code includes: sensing data acquisition code configured to cause at least one processor to acquire sensing data obtained through sensing downward from sky by a flight vehicle flying in a specific zone; and flood-damaged area identification code configured to cause at least one processor to identify a flood-damaged area where flood damage has occurred in the specific zone on the basis of the sensing data obtained through the sensing.

The program code may further include: map acquisition code configured to cause at least one processor to acquire a first rap of the specific zone before occurrence of the flood damage; and map production code configured to cause at least one processor to generate a second map of the specific zone at a time of occurrence of the flood damage on the basis of the sensing data acquired by the sensing data obtained through the sensing. In this case, the flood-damaged area identification code causes the at least one processor to identify the flood-damaged area by comparing the first map with the second map.

The first map and the second map may be a three-dimensional map. In this case, the program code further includes water depth identification code causes the at least one processor to identify a water depth around an object by comparing a height of the object appearing in the first map with a height of the object appearing in the second map.

The program code further may include learned model acquisition code configured to cause at least one processor to acquire a learned model that has learned using training data including, as input data, sensing data obtained through sensing downward from sky by a flight vehicle flying in an arbitrary zone, and, as output data, a flood-damaged area identified as an area where flood damage has occurred in the arbitrary zone. In this case, the flood-damaged area identification code causes the at least one processor to identify the flood-damaged area output from the learned model by inputting the sensing data obtained through the sensing to the learned model.

The program code further may include water surface identification code configured to cause at least one processor to identify a water surface from the identified flood-damaged area.

The program code further may include moving allowance area identification code configured to cause at least one processor to identify, on the basis of at least one of an extent of the identified water surface or a depth from the identified water surface, a moving allowance area where a mobile body can move in the flood-damaged area.

The program code further may include: person identification code configured to cause at least one processor to identify a position of a person in need of rescue in the flood-damaged area; and rescue route generation code configured to cause at least one processor to generate a rescue route from a position of the mobile body to the position of the person in need of rescue on the basis of the identified moving allowance area and the identified position of the person in need of rescue.

The rescue route generation code may cause the at least one processor to generate the rescue route on the basis of at least one of a direction or a speed of water flow in the moving allowance area.

The rescue route generation code may cause the at least one processor to generate a plurality of the rescue routes, and assign recommendation ranks different from each other to the plurality of the rescue routes, respectively.

The rescue route generation code may cause the at least one processor to generate the rescue route further on the basis of a size of the mobile body.

The information processing device includes: at least one memory configured to store program code; and at least one processor configured to access the program code and operate as instructed by the program code. The program code includes: sensing data acquisition code configured to cause at least one processor to acquire sensing data obtained through sensing downward from sky by a flight vehicle flying in a specific zone; and flood-damaged area identification code configured to cause at least one processor to identify a flood-damaged area where flood damage has occurred in the specific zone on the basis of the sensing data obtained through the sensing.

The information processing method executed by one or a plurality of computers. The information processing method includes: acquiring sensing data obtained through sensing downward from sky by a flight vehicle flying in a specific zone; and identifying a flood-damaged area where flood damage has occurred in the specific zone on the basis of the acquired sensing data.

BRIEF DESCRIPTION OF THE DRAWINGS

FIG. 6A is a diagram illustrating an example of height of a building appearing in a map before occurrence of flood damage.

FIG. 6B is a diagram illustrating an example of height of a building appearing in a map at occurrence of flood damage.

DETAILED DESCRIPTION

Hereinafter, an embodiment of the present invention will be described with reference to the drawings.

[1. Configuration of Information Processing System S]

Figure 1:
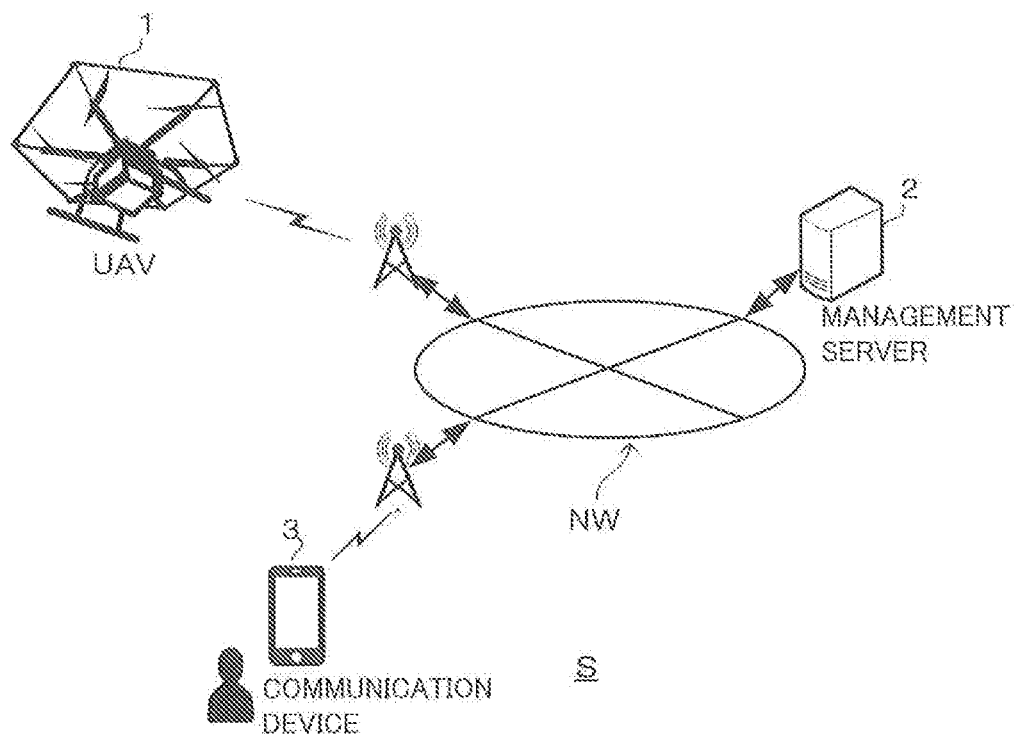
FIG. 1 is a diagram illustrating a schematic configuration example of an information processing system S.

First, a configuration of an information processing system S according to an embodiment of the present invention will be described with reference to FIG. 1. FIG. 1 is a diagram illustrating a schematic configuration example of the information processing system. As illustrated in FIG. 1, the information processing system S includes an unmanned aerial vehicle (hereinafter, referred to as UAV) 1, a management server 2 (an example of an information processing device), and a communication device 3. The UAV 1, the management server 2, and the communication device 3 can communicate with each other via a communication network NW. The communication network NW includes, for example, the Internet, a mobile body communication network, and a radio base station of the network.

The UAV 1 is an example of a flight vehicle (aerial vehicle) capable of unmanned flight, and is also called a drone or a multicopter. The UAV 1 flies under remote control of an operator, or autonomously flies in a specific zone including a flood-damaged area where flood damage (water disaster) has occurred. Here, the flood damage generally occurs due to inland flooding or coastal flooding. The flood damage includes, for example, a flood during a heavy rain or a typhoon, a mudslide, breakage of a river, and flooding of a road in an urban area. The UAV 1 is managed by a GCS (Ground Control Station). The GCS may be, for example, mounted as an application on a control terminal operated by an operator, or may be configured with a server such as the management server 2. Incidentally, although the example in FIG. 1 illustrates one UGV 1, there may be a plurality of UGVs 1.

The management server 2 is a server that manages information on the flood damage. The communication device 3 is a device possessed by a rescuer who goes to rescue a person in need of rescue (sufferer) in the flood-damaged area, and configured to notify the rescuer of information on the flood damage. The rescuer may go to rescue the person in need of rescue on foot or on a rescue boat movable on water. The rescuer and the rescue boat are an example of a mobile body. Other examples of a mobile body include a rescue UGV (Unmanned Ground Vehicle). The rescue UGV is a mobile body capable of autonomous unmanned moving on land (including shallow water) with relief goods loaded thereon. The rescue UGV can communicate with the management server 2 via the communication network NW. Incidentally, the rescue UGV may be a vehicle having wheels or a robot having no wheels (such as a biped walking robot).

[1-1. Configuration and Function of UAV 1]

Figure 2:
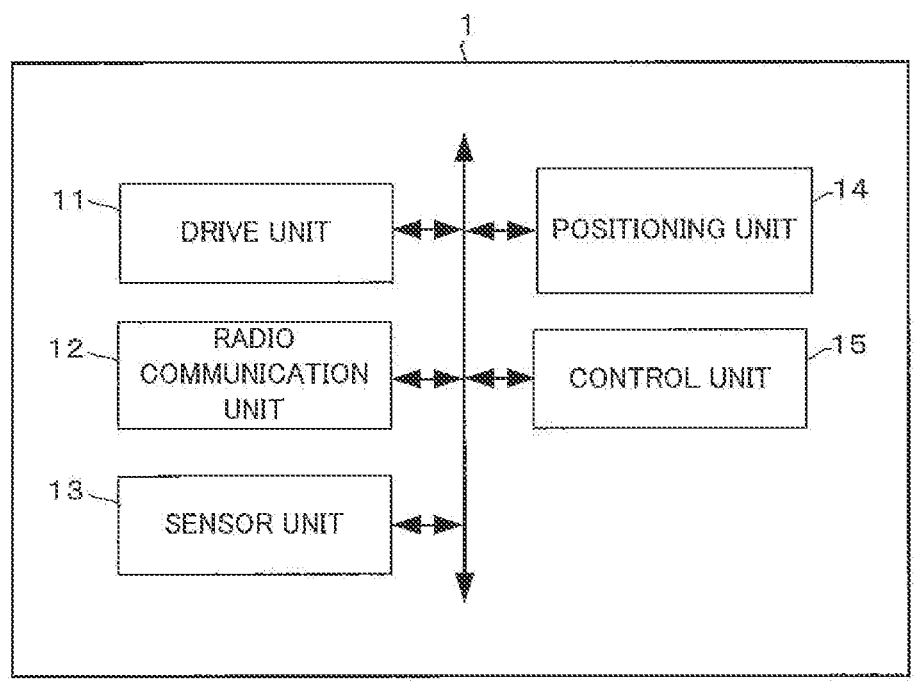
FIG. 2 is a diagram illustrating a schematic configuration example of an UAV 1.
Figure 3:
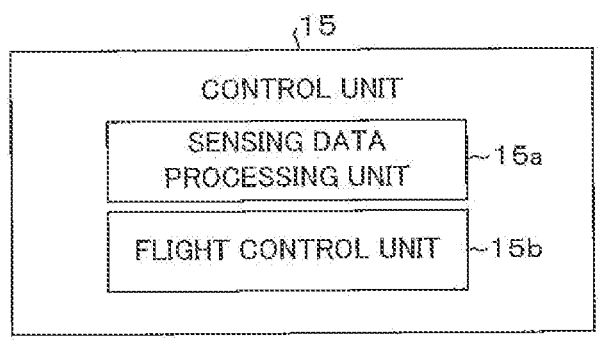
FIG. 3 is a diagram illustrating an example of functional blocks in a control unit 15.

Next, a configuration and a function of the UAV 1 will be described with reference to FIGS. 2 and 3. FIG. 2 is a diagram illustrating a schematic configuration example of the UAV 1. As illustrated in FIG. 2, the UAV 1 includes a drive unit 11, a radio (wireless) communication unit 12, a sensor unit 13, a positioning unit 14, a control unit 15, and the like. Incidentally, although not illustrated, the UAV 1 includes a rotor (propeller) as a horizontal rotary wing, and a battery that supplies power to each unit of the UAV 1. The drive unit 11 includes a motor, a rotation shaft, and the like. The drive unit 11 rotates a plurality of rotors with the motor, the rotation shaft, and the like that are driven in accordance with a control signal output from the control unit 15. The radio communication unit 12 controls communication with the management server 2 via the communication network NW.

The sensor unit 13 includes various sensors necessary for flight control of the UAV 1. The various sensors include an optical sensor, a three-axis angular velocity sensor, a three-axis acceleration sensor, a geomagnetic sensor, and the like. The detection data detected by the sensor unit 13 are output to the control unit 15. Moreover, the optical sensor includes, for example, a camera (two-dimensional or three-dimensional camera) or a LiDAR (Light Detection And Ranging or Laser imaging Detection And Ranging), and is also used for sensing downward from the sky (air) above the specific zone (non-contact sensing). Here, the term "sensing" refers to observing the state (situation) of the ground surface (including a water surface) by capturing the ground surface within a range that can be sensed (for example, a range in the angle of view of the camera). Such sensing is performed one or more times in the specific zone. Incidentally, the sensing is to be continually performed in time series for improvement in the accuracy of the sensing, and the time interval of the sensing may be constant or indefinite.

The positioning unit 14 includes a radio wave receiver, an altitude sensor, and the like. The positioning unit 14 receives, for example, a radio wave transmitted from a GNSS (Global Navigation Satellite System) satellite with the radio wave receiver, and detects the current position (latitude and longitude) of the UAV 1 in the horizontal direction on the basis of the radio wave. Incidentally, the current position of the UAV 1 is the flight position of the UAV 1 during flight. The current position of the UAV 1 in the horizontal direction may be corrected on the basis of the image captured by the optical sensor or the radio wave transmitted from the radio base station. The position information indicating the current position detected by the positioning unit 14 is output to the control unit 15. Furthermore, the positioning unit 14 may detect the current position of the UAV 1 in the vertical direction (altitude) with the altitude sensor such as an atmospheric pressure sensor. In this case, the position information includes the altitude information indicating the altitude of the UAV 1.

The control unit 15 includes at least one CPU (Central Processing Unit) as a processor, a ROM (Read Only Memory), a RAM (Random Access Memory), a nonvolatile memory, and the like. FIG. 3 is a diagram illustrating an example of functional blocks in the control unit 15. The control unit 15 functions as a sensing data processing unit 15*a* and a flight control unit 15*b* as illustrated in FIG. 3 according to, for example, a program (program code group) stored in the ROM or the nonvolatile memory.

The sensing data processing unit 15*a* acquires the sensing data obtained through sensing by the optical sensor of the UAV 1, and makes the radio communication unit 12 transmit the sensing data to the management server 2 (for example, every time the sensing data are acquired from the sensor unit 13). The flight control unit 15*b* executes flight control of the UAV 1. In the flight control, the rotation speed of the rotor and the position, the attitude, and the moving direction of the UAV 1 are controlled using the detection data from the sensor unit 13, the position information from the positioning unit 14, and the like. During the flight of the UAV 1, the flight control unit 15*b* successively transmits the position information from the positioning unit 14 to the management server 2 (or to the management server 2 via the GCS).

[1-2. Configuration and Function of Management Server 2]

Figure 4:
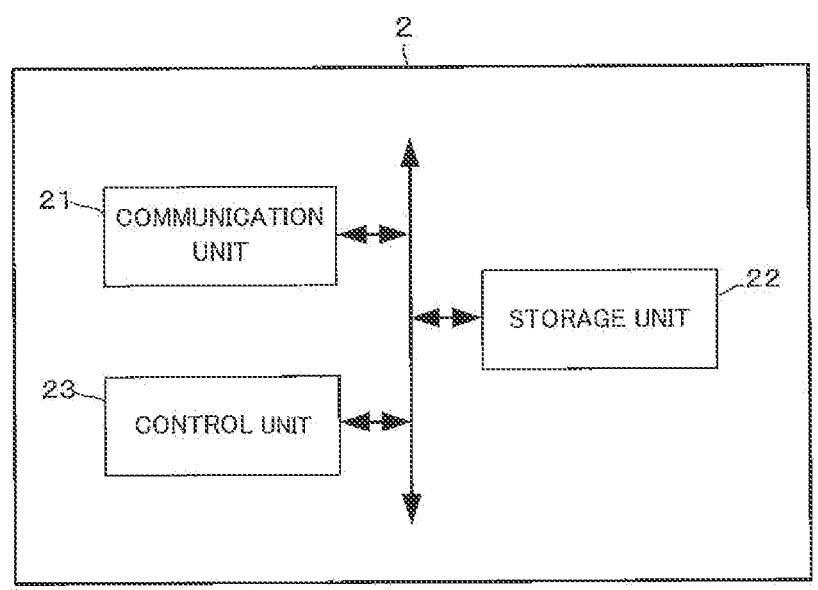
FIG. 4 is a diagram illustrating a schematic configuration example of a management server 2.

Next, a configuration and a function of the management server 2 will be described with reference to FIGS. 4 and 5. FIG. 4 is a diagram illustrating a schematic configuration example of the management server 2. As illustrated in FIG. 4, the management server 2 includes a communication unit 21, a storage unit 22, a control unit 23, and the like. The communication unit 21 controls communication with the UAV 1 via the communication network NW. The communication unit 21 receives the sensing data and the like transmitted from the UAV 1. The storage unit 22 includes, for example, a hard disk drive.

The storage unit 22 stores a map of the specific zone before the flood damage occurs (that is an example of a first map, and hereinafter referred to as "map before occurrence of flood damage"). Here, the map before occurrence of flood damage is, for example, image data indicating the state of the ground surface in the specific zone before flood damage occurs. Such image data include pixels having a pixel value representing the shade of a color or the brightness (also referred to as luminance value), and each pixel is linked with position information (for example, latitude and longitude). Furthermore, each pixel may be linked with (associated with) the reflectance from the ground surface. According to the map before occurrence of flood damage, for example, it is possible to identify, with the pixel values, the states of a river, a pond, a swamp, a lake, a mountain, a tree, a building, a road, and the like existing on the ground surface in the specific zone before flood damage occurs. Moreover, the map before occurrence of flood damage is desirably a three-dimensional map having height information of a tree, a building, and the like. In this case, for example, the height information is linked with each pixel in the image data of the map before occurrence of flood damage.

Moreover, the storage unit 22 may store a learned model that has learned using training data including, as input data, sensing data obtained through sensing of the ground from the sky above by a flight vehicle such as an UAV flying in an arbitrary zone, and, as output data, a flood-damaged area identified as an area where flood damage has occurred in the arbitrary zone (for example, position information indicating a flood-damaged area). Here, the flood-damaged area is desirably identified with a method described below.

The control unit 23 includes at least one CPU as a processor, a ROM, a RAM, a nonvolatile memory, and the like. FIG. 5 is a diagram illustrating an example of functional blocks in the control unit 23. The ROM or the non-volatile memory is configured to store a program (program code). The CPU is configured to access the program code and operate as instructed by the program code. The program code includes: sensing data acquisition code configured to cause the CPU to acquire sensing data obtained through sensing downward from sky by the UAV 1 flying in the specific zone; and flood-damaged area identification code configured to cause at the CPU to identify the flood-damaged area where the flood damage has occurred in the specific zone on the basis of the sensing data obtained through the sensing. The program code may further include: map acquisition code configured to cause the CPU to acquire the map before occurrence of flood damage; and map production code configured to cause the CPU to generate a map of the specific zone at the time of occurrence of the flood damage on the basis of the sensing data acquired by the sensing data obtained through the sensing. The program code further may include learned model acquisition code configured to cause the CPU to acquire the learned model. The program code further may include water surface identification code configured to cause the CPU to identify the water surface from the flood-damaged area. The program code further may include moving allowance area identification code configured to cause the CPU to identify, on the basis of at least one of an extent of the water surface or a depth from the water surface, a moving allowance area where the mobile body can move in the flood-damaged area. The program code further r may include: person identification code configured to cause the CPU to identify a position of the person in need of rescue in the flood-damaged area; and rescue route generation code configured to cause the CPU to generate a rescue route from a position of the mobile body to the position of the person in need of rescue an the basis of the moving allowance area and the position of the person in need of rescue.

Figure 5:
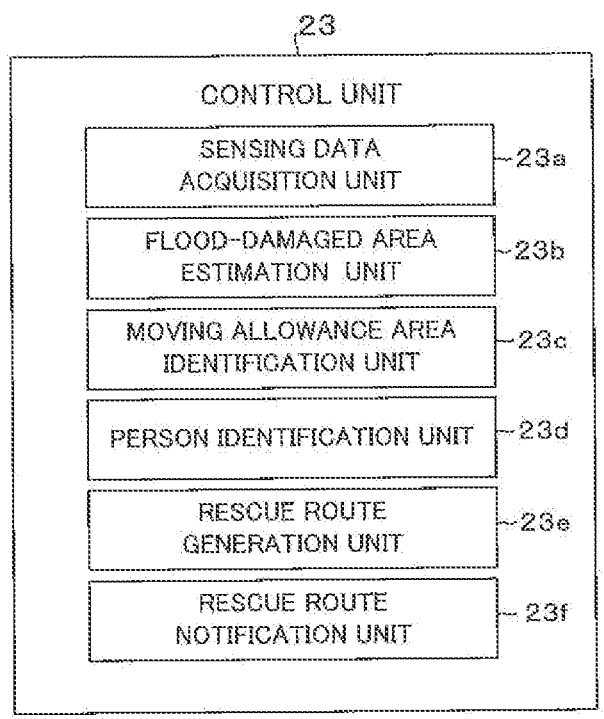
FIG. 5 is a diagram illustrating an example of functional blocks in a control unit 23.

The control unit 23 functions as a sensing data acquisition unit 23*a*, a flood-damaged area estimation unit 23*b*, a moving allowance area identification unit 23*c*, a person identification unit 23*d*, a rescue route generation unit 23*e*, a rescue route notification unit 23*f*, and the like as illustrated in FIG. 5 according to, for example, a program (program code) stored in the ROM or the nonvolatile memory.

The sensing data acquisition unit 23*a* acquires sensing data at occurrence of the flood damage from the UAV 1. The flood-damaged area estimation unit 23*b* executes estimation calculation on the basis of the sensing data acquired by the sensing data acquisition unit 23*a* for identification of the flood-damaged area where the flood damage has occurred in the specific zone sensed by the UAV 1. In the estimation calculation, for example, the flood-damaged area estimation unit 23*b* acquires the map before occurrence of flood damage from the storage unit 22, and generates a map of the specific zone at the time of occurrence of the flood damage (that is an example of a second map, and is hereinafter referred to as "map at occurrence of flood damage") on the basis of the sensing data.

Here, the map at occurrence of flood damage is, for example, image data indicating the state of the ground surface in the specific zone at the time of occurrence of flood damage. Each pixel in such image data has a pixel value in the same manner as in the map before occurrence of flood damage, and is linked with position information. Furthermore, each pixel may be linked with the reflectance from the ground surface. According to the map at occurrence of flood damage, for example, it is possible to identify, with the pixel values, the states of a river, a pond, a swamp, a lake, a mountain, a tree, a building, a road, and the like existing on the ground surface in the specific zone at the time of occurrence of flood damage. Moreover, when sensing data are obtained through sensing by a three-dimensional camera, the map at occurrence of flood damage is a three-dimensional map having height information of a tree, a building, and the like. In this case, for example, the height information is linked with each pixel in the image data of the map at occurrence of flood damage. Incidentally, the position information linked with each pixel is desirably identified on the basis of, for example, the position information at the time of sensing by the UAV 1 and the positional relationship between the UAV 1 at this time and each point in the specific zone (for example, linked with each pixel or pixel group).

In the estimation calculation, the flood-damaged area estimation unit 23*b* aligns the map before occurrence of flood damage with the map at occurrence of flood damage (that is, the same points in a specific area are linked an the basis of the position information of each pixel), compares the aligned map before occurrence of flood damage with the map at occurrence of flood damage, and thus identifies the flood-damaged area. As a result, it is possible to accurately identify the flood-damaged area over a wide range. For example, the flood-damaged area estimation unit 23*b* calculates a difference between the map at occurrence of flood damage and the map before occurrence of flood damage, and identifies a portion (that is, pixel group) where the calculated difference is a threshold or more as the flood-damaged area. That is, the position (range) of the flood-damaged area on the map at occurrence of flood damage is identified.

Here, the difference to be compared with the threshold is, for example, a difference in pixel value of each pixel or a difference in pixel value or each partial area including a plurality of pixels (for example, average of pixel values). Moreover, in a case where the map before occurrence of flood damage and the map at occurrence of flood damage are three-dimensional maps, the difference to be compared with the threshold may be a difference in height of each pixel or a difference in height (for example, height of an object from the ground or water surface) of each partial area including a plurality of pixels. Alternatively, in this case, for example, a difference in pixel value of each pixel or a difference in pixel value of each partial area including a plurality of pixels and a difference in height of each pixel or a difference in height of each partial area including a plurality of pixels may be compared with the threshold to identify a portion where each difference is the threshold or more as the flood-damaged area.

Moreover, in a case where the map before occurrence of flood damage and the map at occurrence of flood damage are three-dimensional maps, the flood-damaged area estimation unit 23*b* may compare the height of an object (for example, a building) appearing in the map before occurrence of flood damage with the height of the object appearing in the map at occurrence of flood damage to identify the water depth (depth from the water surface) around the object. FIGS. 6A and 6B are diagrams illustrating an example of comparison between the height of a building appearing in the map before occurrence of flood damage and the height of the building appearing in the map at occurrence of flood damage. In the example in FIG. 6A, the height of the building B appearing in the map M1 before occurrence of flood damage is 12 m from the ground, and in the example in FIG. 6B, the height of the building B appearing in the map M2 at occurrence of flood damage is 10 m from the water surface. Therefore, the water depth around the building B is calculated to be 2 m. Incidentally, the water surface is identified by, for example, the flood-damaged area estimation unit 23*b* on the basis of the pixel value and the reflectance in the identified flood-damaged area.

As another example of the estimation calculation, an estimation method based on machine learning may be used. In this case, the flood-damaged area estimation unit 23*b* may acquire a learned model from the storage unit 22, input the sensing data acquired by the sensing data acquisition unit 23*a* to the learned model, and thus identify a flood-damaged area output from the learned model (for example, position information indicating the flood-damaged area). As a result, it is possible to accurately identify the flood-damaged area over a wide range. Incidentally, the flood-damaged area estimation unit 23*b* may identify the flood-damaged area from the sensing data using a method other than the above-described method. For example, the flood-damaged area estimation unit 23*b* may analyze a moving image of the sensing data acquired continually in time series, and identify a water area spreading in time series in the specific zone (that is, an area satisfying a predetermined condition of spreading) as the flood-damaged area.

The moving allowance area identification unit 23*c* identifies a moving allowance area where a mobile body can move in the flood-damaged area, for example, on the basis of at least one of the extent of the water surface or the depth from the water surface identified by the flood-damaged area estimation unit 23*b* (for example, identified on the basis of the pixel value and the reflectance in the flood-damaged area). Here, in a case where the mobile body is a rescuer (person), the area identified as a moving allowance area is an area of a water surface having a width that allows passage of a person (that is, a water surface having no obstacle such as rubble) and having a depth from the water surface equal to or less than the length below the knee of a person. Incidentally, in a case where the mobile body is the rescuer, the moving allowance area may be identified only on the basis of the depth of the water surface because the mobile body can cleave a pass through the obstacle floating on the water. Moreover, in a case where the mobile body is a rescue UGV, the moving allowance area may be identified in the same manner as in the case of the rescuer. On the other hand, in a case where the mobile body is a rescue boat, the area identified as a moving allowance area is an area of a water surface having a width that allows passage of the rescue boat and having a depth from the water surface equal to or less than the length of the underwater portion of the rescue boat (for example, a depth such that the rescue boat does not contact with the bottom of water). Incidentally, in a case where the rescue boat is a shallow rubber boat, the moving allowance area may be identified only on the basis of the extent of the water surface.

The person identification unit 23*d* identifies the position of the person in need of rescue in the flood-damaged area identified by the flood-damaged area estimation unit 23*b*. For example, in a case where the person in need of rescue possesses a mobile terminal having a GPS (Global Positioning System) function, it is desirable that the position information detected with the GPS function be transmitted to the management server 2 in response to the operation of the mobile terminal by the person in need of rescue. In this case, the person identification unit 23*d* identifies the position of the person in need of rescue on the basis of the position information received. Alternatively, the person identification unit 23*d* may identify the position of the person in need of rescue by detecting a person existing in the flood-damaged area on the basis of the sensing data acquired by the sensing data acquisition unit 23a. In this case, the person identification unit 23d may identify a person who is sending some signal (for example, a signal for request of rescue, such as waving a hand) in the flood-damaged area as the person in need of rescue.

On the basis of the moving allowance area identified by the moving allowance area identification unit 23c and the position of the person in need of rescue identified by the person identification unit 23d, the rescue route generation unit 23e generates a rescue route from the position of the mobile body to the position of the person in need of rescue. As a result, it is possible to generate an appropriate rescue route for rescue of the person in need of rescue. Here, a predetermined number (for example, three) of top rescue routes ranked in ascending order of distance may be generated. Moreover, the rescue route generation unit 23e desirably generates one or a plurality of rescue routes having a width (width in the direction orthogonal to the moving direction of the mobile body) that allows passage of the mobile body on the basis of the size of the mobile body (for example, vertical and horizontal sizes of the plane) in addition to the moving allowance area and the position of the person in need of rescue. As a result, it is possible to generate a rescue route suitable for the size of the mobile body.

Figure 7:
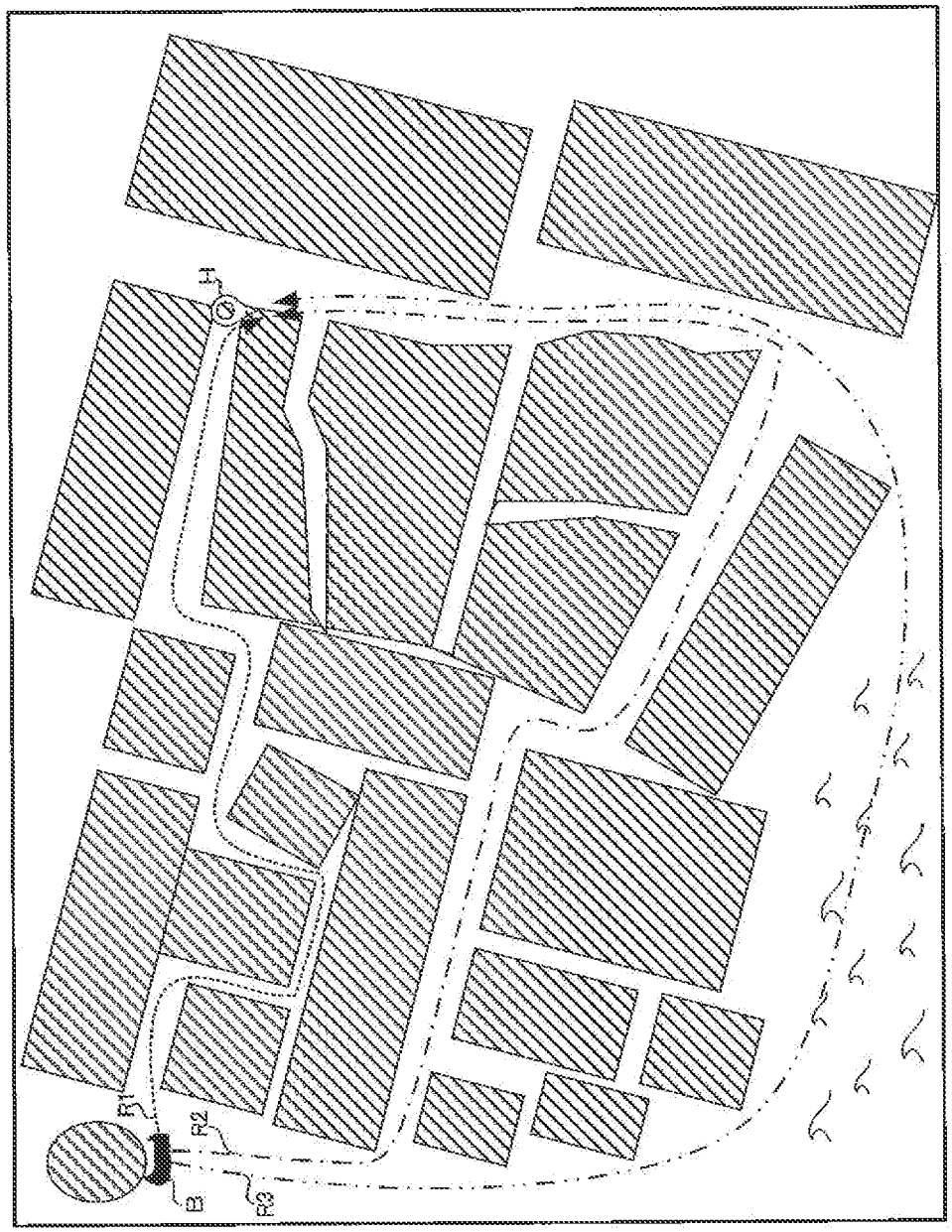
FIG. 7 is a diagram illustrating an example of a rescue route in a flood-damaged area.

Furthermore, the rescue route generation unit 23e may generate, on the basis of at least one of a direction or a speed of the water flow in the moving allowance area identified by the moving allowance area identification unit 23c, one or a plurality of rescue routes along which the mobile body can smoothly move. Incidentally, the direction and the speed of the water flow can be calculated from, for example, the movement of the wave appearing on the water surface an the rescue route. The movement is obtained by analyzing the moving image of the sensing data acquired continually in time series. FIG. 7 is a diagram illustrating an example of a rescue route in the flood-damaged area. In the example in FIG. 7, three rescue routes R1 to R3 from a rescue boat B to the person H in need of rescue are illustrated.

Among the plurality of rescue routes R1 to R3, the rescue route R1 is the shortest route, but the rescue route R1 not necessarily the optimum route in consideration of the extent of the water surface, the water depth, and the direction and the speed of the water flow. Therefore, the rescue route generation unit 23e assigns a recommendation rank to the rescue route based on at least one of the extent of the water surface, the water depth, the direction of the water flow, or the speed of the water flow in the generated rescue route in addition to the distance of the generated rescue route. As a result, recommendation ranks different from each other are assigned to the generated plurality of rescue routes, respectively. For example, the recommendation rank is determined in accordance with a calculation formula in which the distance, the extent of the water surface, the water depth, and the direction and the speed of the water flow are set as parameters (variables), the parameters are each multiplied by a weighting factor, and the resulting parameters are added. Such a recommendation rank can effectively assist the rescuer in selecting one of the plurality of rescue routes. Incidentally, for example, the degree of recommendation of the recommendation rank increases in the order of the rank C, the rank B, and the rank A.

The rescue route notification unit 23f notifies the rescuer of the rescue route generated by the rescue route generation unit 23e by transmitting, to the communication device 3, the information indicating the rescue route. For example, the information indicating the rescue route is desirably displayed on the display of the communication device 3 together with the map at occurrence of flood damage (for example, superimposed on the map at occurrence of flood damage). As a result, the rescuer can secure an appropriate rescue route, so that the rescuer can quickly go to rescue the person in need of rescue who is left behind, for example, in an isolated village or on the roof of a house due to the flood damage. Moreover, in a case where a plurality of rescue routes are generated by the rescue route generation unit 23e, the recommendation ranks assigned to the rescue routes respectively are desirably displayed together with the map at occurrence of flood damage. As a result, the rescuer can select the rescue route determined to be appropriate from the plurality of rescue routes on the spot and go to rescue the person in need of rescue.

[2. Operation of Information Processing System S]

Next, an operation of the information processing system S will be described with reference to FIG. 8. FIG. 6 is a flowchart showing an example of the process of the control unit 23 at the time of occurrence of flood damage. First, the UAV 1 flies toward, for example, a specific zone instructed by an operator, performs sensing downward from the sky when arriving at the specific zone, and transmits the obtained sensing data to the management server 2. When the communication unit 21 of the management server 2 receives the sensing data, the process shown in FIG. 8 starts. The sensing data acquisition unit 23a acquires the sensing data at the time of occurrence of flood damage from the UAV 1.

Figure 8:
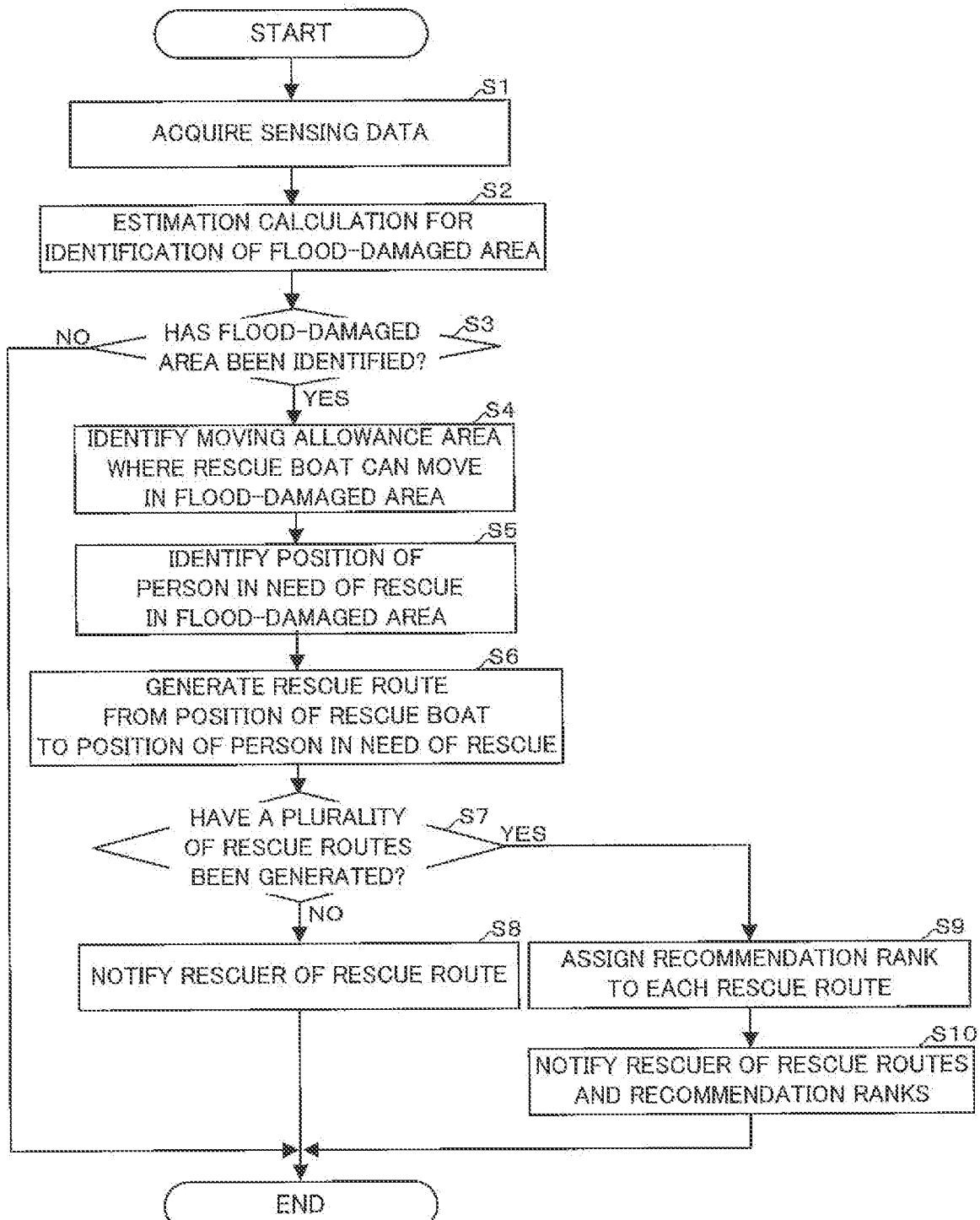
FIG. 8 is a flowchart showing an example of a process of the control unit 23 at the time of occurrence of flood damage.

When the process shown in FIG. 8 starts, the control unit 23 acquires the sensing data received by the communication unit 21 (step S1). Next, the control unit 23 executes estimation calculation on the basis of the sensing data acquired in the step S1 for identification of a flood-damaged area where flood damage has occurred in the specific zone (step 32).

Next, the control unit 23 determines (in other words, judges) whether the flood-damaged area has been identified by the estimation calculation in the step S2 (step 33). If the control unit 23 determines that the flood-damaged area has been identified by the estimation calculation (step S3: YES), the process proceeds to a step 34. If the control unit 23 determines that the flood-damaged area cannot be identified by the estimation calculation (step S3: NO), the process shown in FIG. 8 ends, and the control unit 23 waits for reception of next sensing data.

In the step S4, the control unit 23 identifies a water surface from the flood-damaged area identified in the step S3, and identifies, on the basis of at least one of the extent of the water surface or the depth from the water surface, a moving allowance area where a rescue boat can move in the flood-damaged area. Next, the control unit 23 identifies, on the basis of the sensing data acquired in the step S1, the position of the person in need of rescue in the flood-damaged area identified in the step S3 (step S5). Incidentally, as described above, the position of the person in need of rescue may be identified on the basis of the position information received from the mobile terminal possessed by the person in need of rescue.

Next, the control unit 23 generates a rescue route from the position of the rescue boat to the position of the person in need of rescue on the basis of the moving allowance area identified in the step S4 and the position of the person in need of rescue identified in the step S5 (step 36). Next, the control unit 23 determines whether a plurality of rescue routes have been generated in the step S6 (step 37). If it is determined that a plurality of rescue routes have not been generated (step S7: NO), the process proceeds to a step S8. If it is determined that a plurality of rescue routes have been generated (step S7: YES), the process proceeds to a step 39.

In the step S8, the control unit 23 notifies the rescuer of the rescue route generated in the step S6 by transmitting, to the communication device 3, the information indicating the rescue route, and the process shown in FIG. 8 ends. Incidentally, the information indicating the rescue route may be transmitted to a mail address of the rescuer. In the step 39, the control unit 23 determines a recommendation rank for each rescue route generated in the step S6, and assigns the determined recommendation rank to each rescue route. Next, the control unit 23 notifies the rescuer of the rescue routes generated in the step 36 and the recommendation ranks assigned to the rescue routes respectively in the step 39 by transmitting the information indicating the rescue routes and the recommendation ranks to the communication device 3, and the process shown in FIG. 8 ends.

As described above, information processing system S acquires sensing data obtained through sensing downward from the sky by the UAV 1 flying in the specific zone, and identifies the flood-damaged area where the flood damage has occurred in the specific zone an the basis of the acquired sensing data. Therefore, it is possible to quickly identify the flood-damaged area over a wide range.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. For example, in an embodiment described above, the case is described, as an example, in which the management server 2 identifies the flood-damaged area where the flood damage has occurred in the specific zone on the basis of sensing data obtained through sensing downward from the sky by a flight vehicle flying in the specific zone. However, the UAV 1 may identify the flood-damaged area where the flood damage has occurred in the specific zone during flight on the basis of the sensing data.

Furthermore, the UAV 1 may identify a moving allowance area where a mobile body can move in the flood-damaged area and the position of the person in need of rescue in the flood-damaged area, and generate a rescue route from the position of the mobile body to the position of the person in need of rescue on the basis of the moving allowance area and the position of the person in need of rescue. Moreover, in an embodiment described above, the UAV is described as an example of the flight vehicle, but the flight vehicle is also applicable to a manned aerial vehicle capable of flying in the air regardless of whether an operator (pilot) is present in the vehicle.

REFERENCE SIGNS LIST

1 UAV
2 Management server
3 Communication device
11 Drive unit
12 Radio communication unit
13 Sensor unit
14 Positioning unit
15 Control unit
15a Sensing data processing unit
15b Flight control unit
21 Communication unit
22 Storage unit
23 Control unit
23a Sensing data acquisition unit
23b Flood-damaged area estimation unit
23c Moving allowance area identification unit
23d Person identification unit
23e Rescue route generation unit
23f Rescue route notification unit
S information processing system

What is claimed is:

1. An information processing system for processing data obtained by a flight vehicle sensing downward from a sky for flood-damaged areas, the information processing system comprising:
at least one memory configured to store program code; and
at least one processor configured to access the program code and operate as instructed by the program code, the program code including:
sensing data acquisition code configured to cause at least one processor to acquire sensing data obtained by sensing downward from the sky by a flight vehicle flying in a specific zone;
flood-damaged area identification code configured to cause at least one processor to identify a flood-damaged area where flood damage has occurred in the specific zone on the basis of the sensing data obtained by the sensing;
map acquisition code configured to cause at least one processor to acquire a first map of the specific zone before occurrence of the flood damage; and
map production code configured to cause at least one processor to generate a second map of the specific zone at a time of occurrence of the flood damage on the basis of the sensing data acquired by the sensing data obtained by the sensing, wherein
the flood-damaged area identification code causes the at least one processor to identify the flood-damaged area by comparing the first map with the second map,
the first map is image data indicating the state of the ground surface in the specific zone before flood damage occurs, pixels in the image data have a pixel value representing the shade or the brightness of a color, and each pixel is linked with position information,
the second map is image data indicating the state of the ground surface in the specific zone at the time of occurrence of flood damage, pixels in the image data have a pixel value representing the shade or the brightness of the color, and each pixel is linked with position information, and
the flood-damaged area identification code causes the at least one processor to align the first map and the second map based on the position information of each pixel, calculate a difference between the aligned first map and the second map, and identify a portion where the calculated difference is greater than a threshold as the flood-damaged area.

2. The information processing system according to claim 1, wherein
the first map and the second map are a three-dimensional map, and
the program code further includes water depth identification code causes the at least one processor to identify a water depth around an object by comparing a height of the object appearing in the first map with a height of the object appearing in the second map.

3. The information processing system according to claim 1, the program code further including learned model acquisition code configured to cause at least one processor to acquire a learned model that has learned using training data including, as input data, sensing data obtained through sensing downward from sky by a flight vehicle flying in an arbitrary zone, and, as output data, a flood-damaged area identified as an area where flood damage has occurred in the arbitrary zone, wherein
the flood-damaged area identification code causes the at least one processor to identify the flood-damaged area output from the learned model by inputting the sensing data obtained through the sensing to the learned model.

4. The information processing system according to claim 1, the program code further including water surface identification code configured to cause at least one processor to identify a water surface from the identified flood-damaged area.

5. The information processing system according to claim 4, the program code further including moving allowance area identification code configured to cause at least one processor to identify, on the basis of at least one of an extent of the identified water surface or a depth from the identified water surface, a moving allowance area where a mobile body can move in the flood-damaged area.

6. The information processing system according to claim 5, the program code further including:
person identification code configured to cause at least one processor to identify a position of a person in need of rescue in the flood-damaged area; and
rescue route generation code configured to cause at least one processor to generate a rescue route from a position of the mobile body to the position of the person in need of rescue on the basis of the identified moving allowance area and the identified position of the person in need of rescue.

7. The information processing system according to claim 6, wherein the rescue route generation code causes the at least one processor to generate the rescue route on the basis of at least one of a direction or a speed of water flow in the moving allowance area.

8. The information processing system according to claim 7, wherein the rescue route generation code causes the at least one processor to generate a plurality of the rescue routes, and assign recommendation ranks different from each other to the plurality of the rescue routes, respectively.

9. The information processing system according to claim 7, wherein the rescue route generation code causes the at least one processor to generate the rescue route further on the basis of a size of the mobile body.

10. An information processing device for sensing data obtained by a flight vehicle sensing downward from a sky for flood-damaged areas, the information processing system comprising:
at least one memory configured to store program code; and
at least one processor configured to access the program code and operate as instructed by the program code, the program code including:
sensing data acquisition code configured to cause at least one processor to acquire sensing data obtained through sensing downward from sky by a flight vehicle flying in a specific zone;
flood-damaged area identification code configured to cause at least one processor to identify a flood-damaged area where flood damage has occurred in the specific zone on the basis of the sensing data obtained through the sensing;
map acquisition code configured to cause at least one processor to acquire a first map of the specific zone before occurrence of the flood damage; and
map production code configured to cause at least one processor to generate a second map of the specific zone at a time of occurrence of the flood damage on the basis of the sensing data acquired by the sensing data obtained by the sensing, wherein
the flood-damaged area identification code causes the at least one processor to identify the flood-damaged area by comparing the first map with the second map,
the first map is image data indicating the state of the ground surface in the specific zone before flood damage occurs, pixels in the image data have a pixel value representing the shade or the brightness of a color, and each pixel is linked with position information,
the second map is image data indicating the state of the ground surface in the specific zone at the time of occurrence of flood damage, pixels in the image data have a pixel value representing the shade or the brightness of the color, and each pixel is linked with position information, and
the flood-damaged area identification code causes the at least one processor to align the first map and the second map based on the position information of each pixel, calculate a difference between the aligned first map and the second map, and identify a portion where the calculated difference is greater than a threshold as the flood-damaged area.

11. An information processing method of sensing data obtained by a flight vehicle sensing downward from a sky for flood-damaged areas, the information processing system executed by one or a plurality of computers, the information processing method including:
acquiring sensing data obtained through sensing downward from sky by a flight vehicle flying in a specific zone;
identifying a flood-damaged area where flood damage has occurred in the specific zone on the basis of the acquired sensing data
acquiring a first map of the specific zone before occurrence of the flood damage; and
generating a second map of the specific zone at a time of occurrence of the flood damage on the basis of the sensing data acquired by the sensing data obtained by the sensing; and
identifying the flood-damaged area by comparing the first map with the second map,
wherein the first map is image data indicating the state of the ground surface in the specific zone before flood damage occurs, pixels in the image data have a pixel value representing the shade or the brightness of a color, and each pixel is linked with position information,
wherein the second map is image data indicating the state of the ground surface in the specific zone at the time of occurrence of flood damage, pixels in the image data have a pixel value representing the shade or the brightness of the color, and each pixel is linked with position information, and
wherein the identifying the flood-damaged area comprises aligning the first map and the second map based on the position information of each pixel, calculating a difference between the aligned first map and the second map, and identifying a portion where the calculated difference is greater than a threshold as the flood-damaged area.

* * * * *